United States Patent
Li et al.

(10) Patent No.: US 9,815,944 B2
(45) Date of Patent: Nov. 14, 2017

(54) METHOD FOR PREPARING POLYCARBOSILANE BY CATALYTIC REARRANGING

(71) Applicant: INSTITUTE OF CHEMISTRY, CHINESE ACADEMY OF SCIENCES, Beijing (CN)

(72) Inventors: Yongming Li, Beijing (CN); Xiaogan Yang, Beijing (CN); Caihong Xu, Beijing (CN); Lijuan He, Beijing (CN)

(73) Assignee: INSTITUTE OF CHEMISTRY, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 15/125,003

(22) PCT Filed: Jun. 28, 2014

(86) PCT No.: PCT/CN2014/081063
§ 371 (c)(1),
(2) Date: Sep. 9, 2016

(87) PCT Pub. No.: WO2015/196491
PCT Pub. Date: Dec. 30, 2015

(65) Prior Publication Data
US 2017/0015789 A1    Jan. 19, 2017

(51) Int. Cl.
*C08G 77/60* (2006.01)
*C01B 31/36* (2006.01)

(52) U.S. Cl.
CPC ............. *C08G 77/60* (2013.01); *C01B 31/36* (2013.01)

(58) Field of Classification Search
CPC .................................................. C08G 77/60
See application file for complete search history.

(56) References Cited

FOREIGN PATENT DOCUMENTS

| CN | 101225171 A | 7/2008 |
| CN | 102120822 A | 7/2011 |

OTHER PUBLICATIONS

Yajima et al. (J. Mater. Sci., 13 (1978) 2569-2576).*
Chen, Xunjun et al., "The Influence of B(C6F5)3 on the Thermal Degradation Behavior of Polydimethylsiloxane", New Chemical Materials, vol. 38, No. 04, Apr. 30, 2010.
Xue, Jin' Gen et al., "Research Advance in Synthesis of Precursor Polycarbosilane", Silicone Material, vol. 18, No. 02, Dec. 31, 2004.
Xue, Jin' Gen et al., "Synthesis of Polycarbosilane from the Distilled Fractions of LPS", Journal of National University of Defense Technology, vol. 28, No. 02, Dec. 31, 2006.

* cited by examiner

*Primary Examiner* — Kuo-Liang Peng
(74) *Attorney, Agent, or Firm* — Novick, Kim & Lee, PLLC; Allen Xue

(57) ABSTRACT

This invention provides a method for preparing a polycarbosilane by decomposition and rearrangement a cyclic silane compound or chain polysilane under the catalysis of a boron-containing catalyst in a trace amount (less than 1 wt %). In the method, poly(dimethylsilane) (denoted as PDMS) or a thermal decomposition product thereof, i.e., a liquid silane-carbosilane compound (denoted as LPS), is used as the raw material, less than 1 wt % of the boron-containing catalyst (with respect to the amount of the raw material) is added, and then the temperature is gradually increased to the reaction temperature under atmospheric pressure or high pressure to perform the thermal decomposition/rearrangement reaction so as to obtain solid polycarbosilane (PCS) with a higher ceramic yield. This method has advantages, such as short reaction time, high synthetic yield, good product quality, simple equipment and safe operation; and the polycarbosilane prepared is a polymeric precursor for SiC, and can be used for the preparation of SiC fibers and SiC-based composite materials.

12 Claims, 9 Drawing Sheets

METHOD FOR PREPARING POLYCARBOSILANE BY CATALYTIC REARRANGING

TECHNICAL FIELD

The present invention relates to a method for the synthesis of a polymeric precursor for silicon carbide ceramics, in particular to a catalytic synthesis method for converting solid poly(dimethylsilane) or decomposition products thereof into polycarbosilane via thermal decomposition-rearrangement.

BACKGROUND ART

Ceramic matrix composites (CMC) are crucially and widely used in aircraft, aerospace, weapons, ships, armor protection, high-speed brakes and other fields. Silicon carbide (SiC) matrix composites have a series of advantages, such as high temperature resistance, high strength, high modulus, low density, low coefficient of thermal expansion, and so on, becoming a new generation of strategic thermal structural materials.

A polymeric precursor for silicon carbide ceramic is a matrix resin for the preparation of silicon carbide fibers and silicon carbide matrix composites by the PIP method, and a key raw material for the production of silicon carbide-based high-temperature resistant adhesive, connective and composite ceramics and other fields. It can also be used to prepare a series of high-tech materials from zero-dimension to three-dimension, such as ultrafine ceramic powder, silicon carbide fiber and coating, silicon carbide ceramic, silicon-based advanced composite ceramic, high-temperature resistant resin, and so on.

Polycarbosilane (PCS) prepared by thermal-decomposition and rearrangement (about 450° C.-470° C.) poly(dimethylsilane) (PDMS) invented by Japanese Yajima has recently been used as the polymeric precursor for silicon carbide ceramic, which is the most mature technologies and the largest amount both at home and abroad, and also as the precursor for continuous silicon carbide fiber, which is the only one achieved for commercial application currently. Rearrangement under high pressure and atmospheric pressure are the main method for the preparation of polycarbosilane via rearrangement of poly (dimethylsilane) at high temperature both at home and abroad. The synthesis yield by high pressure method is higher, generally 45%-60%; the quality of the product is better, however, the equipment requirements by high pressure method are increased, and the equipment maintenance requirements are also enhanced, so it needs a relatively large investment and high costs. The synthesis time by atmospheric pressure method is longer and the synthesis yield is lower, generally 30%-42%, therefore, for the atmospheric pressure method, it is also to face high cost problems.

Shortening reaction time, improving synthetic yield and reducing reaction temperature are the current main research directions in the PCS preparation technology under atmospheric pressure. The study has been shown that, when polycarbosilane was prepared by rearrangement at high temperature and under atmospheric pressure, adding catalysts could shorten the synthesis time and improve the synthesis yield. For example, Japanese Y. Hasegawa and K. Okamura had reported that when adding 3-5 wt % of polyborosiloxane as a catalyst, the reaction temperature could be reduced to 350° C. After the reaction was carried out at 350° C. for 10 hours, the yield was up to 50% or more. However, the product had higher O content, lower Si—H bond content, higher Si—Si bond content (11-14%), low ceramic yield and poor storage stability, which could not be spun. When a boron-oxygen catalyst such as tributyl borate $B(OBu)_3$ was added, the similar drawbacks existed. Adding a halide catalyst such as $MCl_3$ (M=Al, Mn, Ti, V), the harmful chlorine ion could be introduced and the ceramic yield of the product could be lower. CN10258535A patent disclosed a method for catalytic rearranging using alumina, Al—Si oxide, Si—Ti oxide or Al—Si—Ti oxide with a high surface area as a catalyst, which resulting in the polycarbosilane synthesis yield of 56-72%, but the reaction temperature in the method was still as high as 460° C. South Korean Dong-Pyo Kim et al. reported that when aluminum silicate molecular sieves were used as a solid acid catalyst, it could significantly reduce the temperature and pressure in the high pressure method.

In summary, in the current methods for the preparation of polycarbosilane via thermal decomposition and rearrangement, whether under atmospheric pressure or high pressure process, it is difficult to achieve the goals simultaneously, such as short reaction time, high yield, lower reaction temperature, good product quality, thus significantly reducing the preparation cost.

DETAILED DESCRIPTION OF THE INVENTION

An object of the present invention is to overcome the deficiencies of the prior art, to provide a method for the preparation of polycarbosilane with short reaction time, low reaction temperature, high synthetic yield, good product quality, simple required equipment, completely compatible with existing processing installations and good security.

The object of the present invention is realized by the following technical schemes:

A method for preparing a polycarbosilane, wherein a poly(dimethylsilane) (denoted as PDMS) or a thermal decomposition product thereof, i.e., a liquid silane-carbosilane compound (denoted as LPS), is used as the raw material, less than 1 wt % of the boron-containing catalyst (with respect to the amount of the raw material) is added, and then the temperature is gradually increased to the reaction temperature under atmospheric pressure or high pressure to perform the thermal decomposition/rearrangement reaction so as to obtain solid polycarbosilane (PCS) with a higher ceramic yield.

According to the present invention, said reaction temperature is 365-400° C., preferably 375-395° C.

According to the present invention, said thermal decomposition/rearrangement reaction is a thermal insulation reaction, reaction time is 1-10 hours, preferably 4-6 hours under atmospheric pressure, and preferably 2-4 hours under high pressure.

According to the present invention, said PDMS is in the form of a powder.

According to the present invention, said reaction is carried out under the protection of nitrogen or argon.

According to the present invention, the amount of said catalyst is preferably less than 0.5 wt %, more preferably 0.05-0.3 wt %, and further more preferably 0.1-0.2 wt %.

According to the present invention, said preparation method specifically comprises the following steps:

(1) Adding the PDMS powder or the LPS liquid into the synthesis apparatus, which is performed the thermal decomposition/rearrangement conversion under atmospheric pressure or high pressure, and under the protection of argon;

(2) Introducing the boron-containing catalyst with stirring into the synthesis apparatus, wherein the amount of said boron-containing catalyst is less than 1 wt % (with respect to the mass of PDMS or LPS);

(3) Heating up to 365-400° C. by means of programmed temperature and reacting for 1-10 hours at the temperature to obtain PCS.

According to the present invention, said preparation method specifically comprises the following steps of:

(1) Adding the PDMS powder or the LPS liquid into the synthesis apparatus, which is performed the thermal decomposition/rearrangement conversion under atmospheric pressure or high pressure, and under the protection of nitrogen or argon;

(2) Introducing the boron-containing catalyst with stirring into the synthesis apparatus, wherein the amount of said boron-containing catalyst is less than 1 wt % (with respect to the mass of PDMS or LPS);

(3) Heating up to 365-400° C. by means of programmed temperature, reacting for 1-10 hours at the temperature, and then cooling to room temperature;

(4) Externally connecting a distillation apparatus, heating the crude product up to 350-400° C. under atmospheric pressure, distilling to remove the low molecule compounds, and cooling to room temperature, i.e. to obtain a pale yellow glassy PCS product of the invention.

According to the present invention, the amount of catalyst in said step (2) is preferably less than 0.5 wt %, more preferably 0.05-0.3 wt %, and further more preferably 0.1-0.2 wt %.

According to the present invention, the temperature in said step (3) is heating up to 375-395° C. by means of programmed temperature. Preferably, said reaction time at the temperature is preferably 4-6 hours under atmospheric pressure, and preferably 2-4 hours under high pressure.

According to the present invention, said boron-containing catalyst is selected from one of the compound of the following general formula (1) or its complexes formed with ether or water.

$B(C_6R_5)_3$      (1)

Wherein, each R is independently selected from H, halogen or a lower alkyl group. Preferably, each R is independently selected from the group consisting of H, F, Cl, Br, methyl, ethyl, n-propyl, isopropyl, n-butyl, isobutyl or tert-butyl. More preferably, each R is independently selected from F, Cl, or Br. Furthermore preferably, said R is selected from F.

According to the present invention, preferably, said boron-containing catalyst is selected from one of tri(pentafluorophenyl)borane ($B(C_6F_5)_3$) or its complexes formed with ether or water. Said complexes formed with ether or water are such as $B(C_6F_5)_3 \cdot H_2O$, $B(C_6F_5)_3 \cdot Et_2O$, $B(C_6F_5)_3 \cdot CH_3OCH_2CH_2OCH_3$. More preferably, said boron-containing catalyst is tri(pentafluorophenyl)borane ($B(C_6F_5)_3$), i.e.,

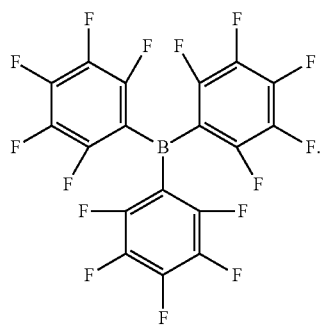

The polycarbosilane product prepared by the invention can be used in the preparation of SiC fibres and SiC-based composite materials.

Compared to the current method for the preparation of polycarbosilane by means of rearrangement at high temperature and atmospheric pressure, the present invention by adding a small amount of boron-containing catalyst, particularly as represented by the general formula (1) or its complexes formed with ether or water can not only ensure the quality of the product, but also dramatically improve the reaction rate and the synthesis yield of PCS; meanwhile, the molecular weight of the product and the ratio of C—H/Si—H is similar to that without the catalyst, and the ceramic yield is relatively higher. Unlike conventional Lewis acids with water-sensitive, oxygen-sensitive and heat-sensitive features, the boron-containing catalyst of the present invention is stable even at the relatively higher temperature (for example 270° C.) and also stable in the present of water and oxygen. Due to strong Lewis acidity and larger steric hindrance, great ability to stabilize the carbanion and to promote the condensation between Si—H bonds of the boron-containing catalyst, it exhibits a highly catalytic efficiency for the rearrangement conversion of the PCS, which other catalysts do not. The harmful O element on the one hand is not introduced, meanwhile, because of less catalyst, an especial catalyst separation process cannot be carried out. Therefore, the method provided by the present invention not only ensures the quality of the product, but also dramatically improve the reaction rate and the synthesis yield of PCS; meanwhile, the molecular weight of the product and the ratio of C—H/Si—H is similar to that without the catalyst, and the ceramic yield is relatively higher.

Compared to the current method for the preparation of polycarbosilane by means of rearrangement at high temperature and atmospheric pressure, the present invention is of simple equipment, low equipment maintenance requirement, and safe production.

In summary, the present invention has the following advantages of: (1) high reaction rate, the reaction time being shorter more than half comparing to the process of the prior art without the catalyst; (2) high synthetic yield, high ceramic yield, the typical synthetic yield of 59%-66%, and the ceramic yield of 65%-75%; (3) low reaction temperature, the maximum reaction temperature at 400° C., typically 375° C.-395° C., which is good for reducing energy consumption and equipment costs; (4) less catalyst, low costs, no harmful elements, such as O, Na, or impurities, and no need to separate the catalyst; (5) higher Si—H content of the product, similar C—H/Si—H ratio to that without the catalyst. To sum up, the present invention can significantly reduce the overall cost of the preparation of polycarbosilane.

The catalyst of the present invention can also be used in combination with other types of catalysts, such as solid acid catalysts including ITQ-2 zeolite, MCM-22 zeolite, ZSM-5 zeolite, and MCM-41 zeolite containing heteroatoms etc.

DETAILED DESCRIPTION OF VARIOUS EXAMPLES

Hereinafter, the present invention will be illustrated with reference to the specific examples. However, these examples are not a limitation to the protection scope of the present invention. Those skilled in the art should recognize that many changes and modifications based on the above-described examples belong to the protection scope of the present invention.

Preparation Example 1 (Preparation of the Raw Material LPS)

The solid PDMS powder (1200 g) was added to a 3 L three-necked reactor, evacuated and purged with argon or nitrogen to remove air three times, and then under argon gas stream protection, heated with heating units up to 390-420° C., thermal decomposed and distilled to give a colorless, transparent liquid silane (LPS) (about 1080 g). The $^1$H-NMR, $^{29}$Si-NMR, GC-MS and FTIR spectra are shown in FIG. 1-3 and FIG. 10(a), respectively. The result of the characterization indicates that LPS is a complex mixture composed of more than 20 kinds of silane—carbosilane ring molecules and small amounts of linear small molecules. The molecular structure can be represented by $[(SiMe_2)_{0.7}(CH_2SiMeH)_{0.3}]$.

Comparative Example 1

Figure 1:
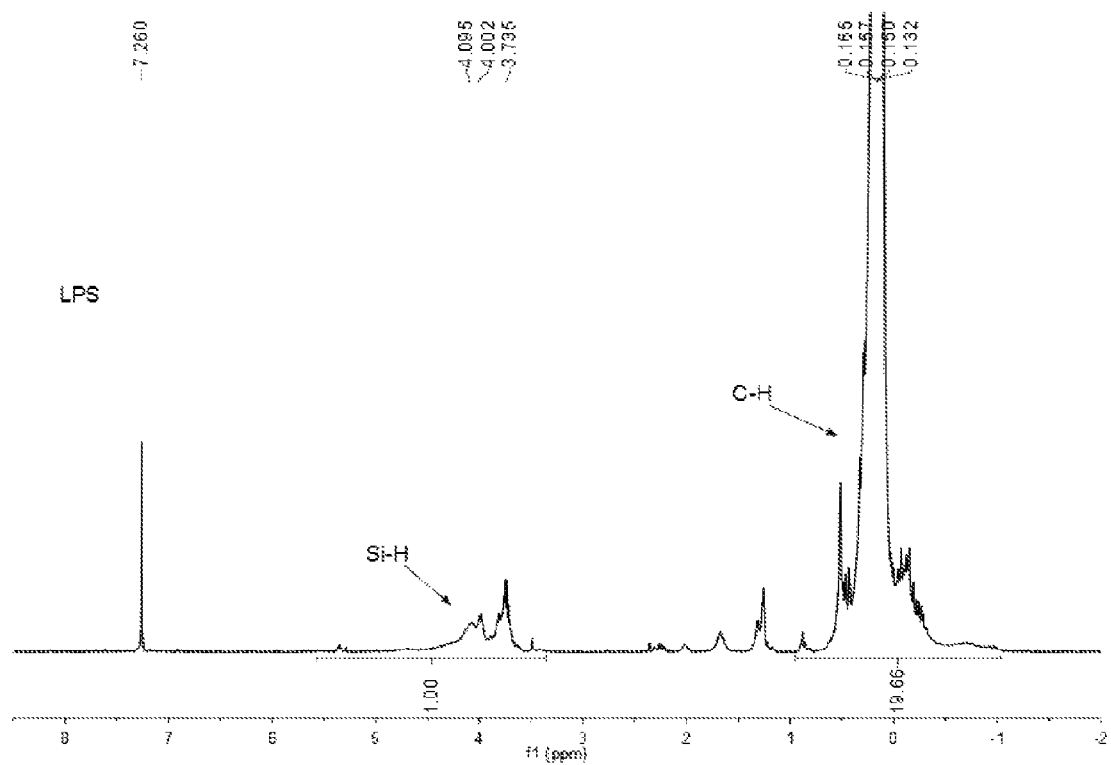
FIG. 1 is a $^1$H-NMR spectrum of the raw material LPS.
Figure 2:
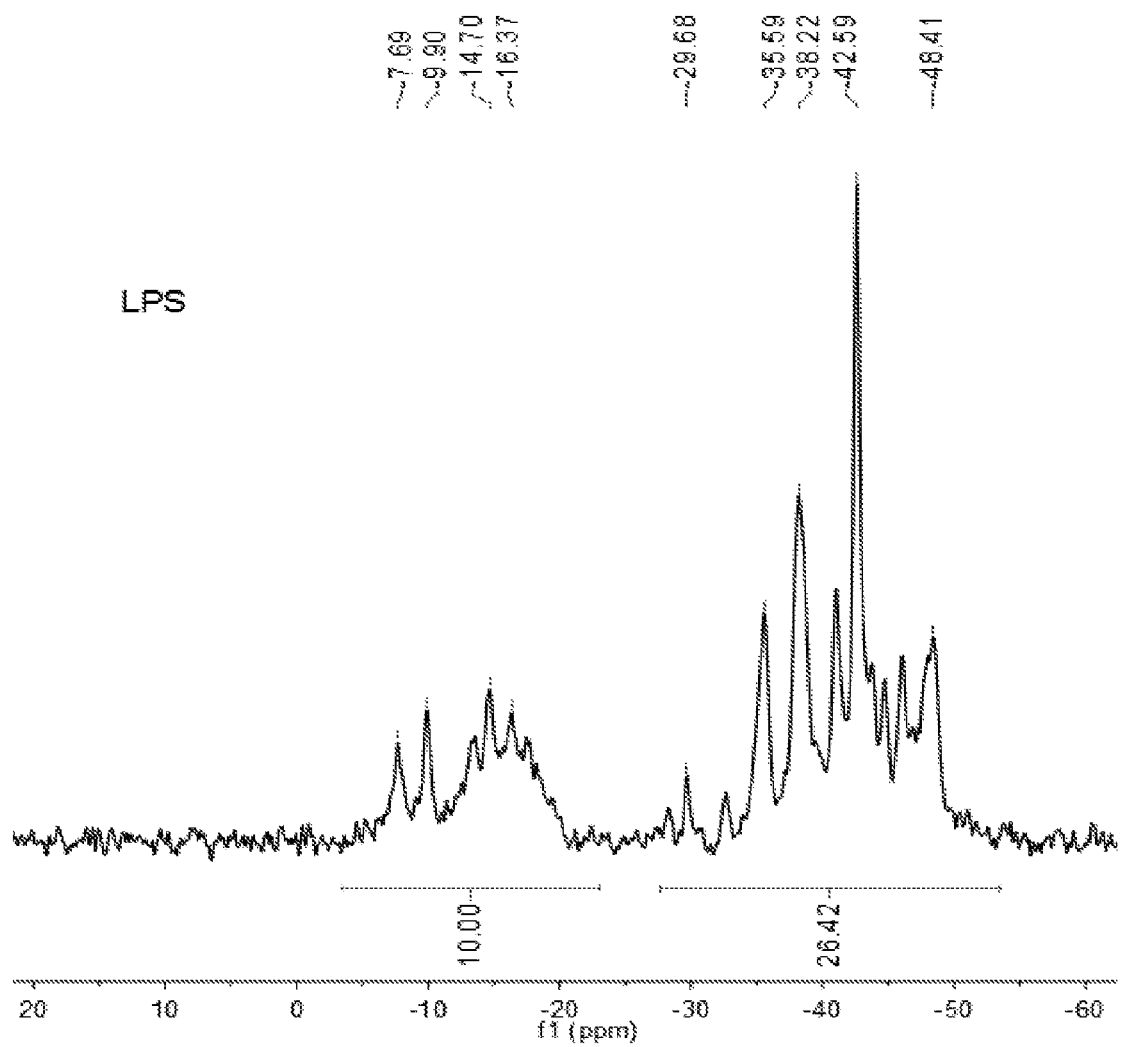
FIG. 2 is a $^{29}$Si-NMR spectrum of the raw material LPS.
Figure 3:
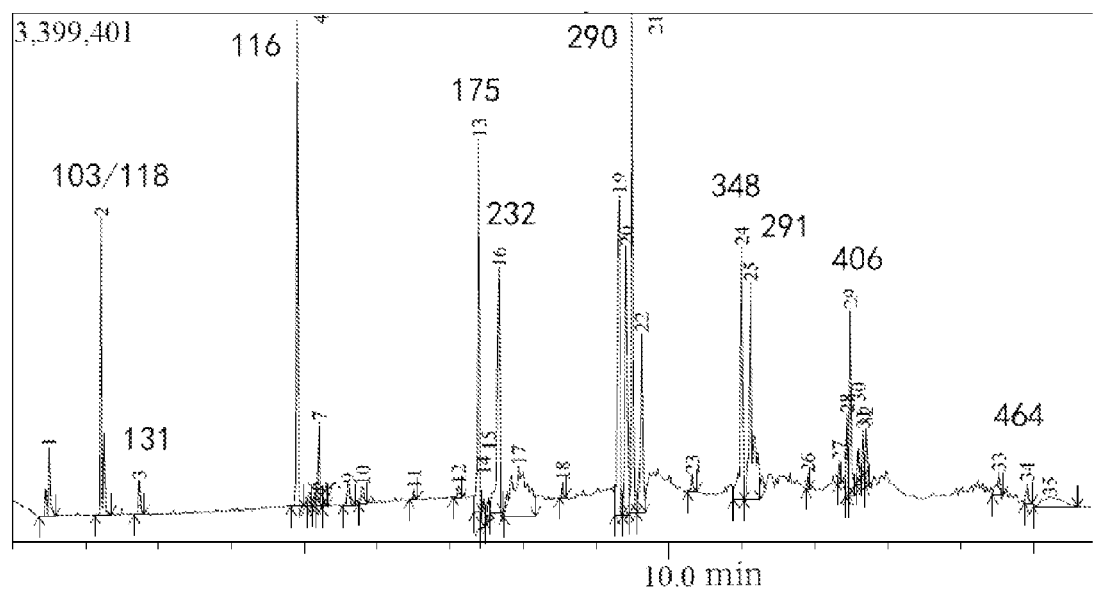
FIG. 3 is a GC-MS spectrum of the raw material LPS.
Figure 4:
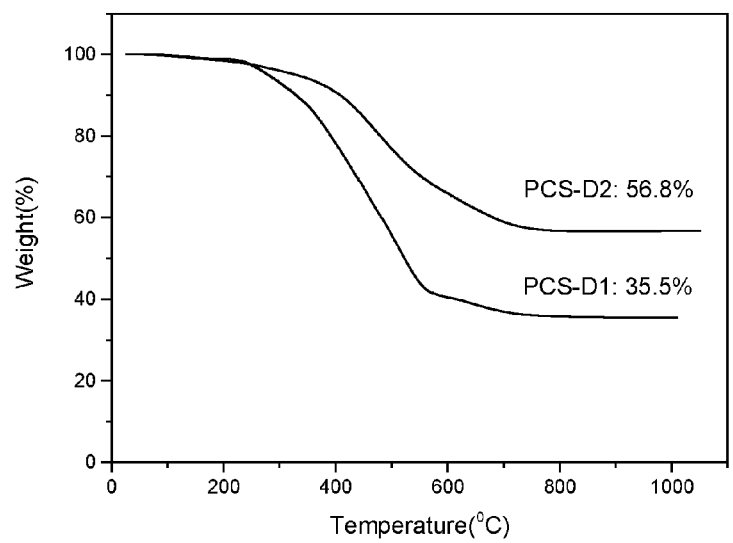
FIG. 4 is the thermo-gravimetric curves of PCS-D1 (COMPARATIVE EXAMPLE 1) and PCS-D2 (COMPARATIVE EXAMPLE 2).
Figure 5:
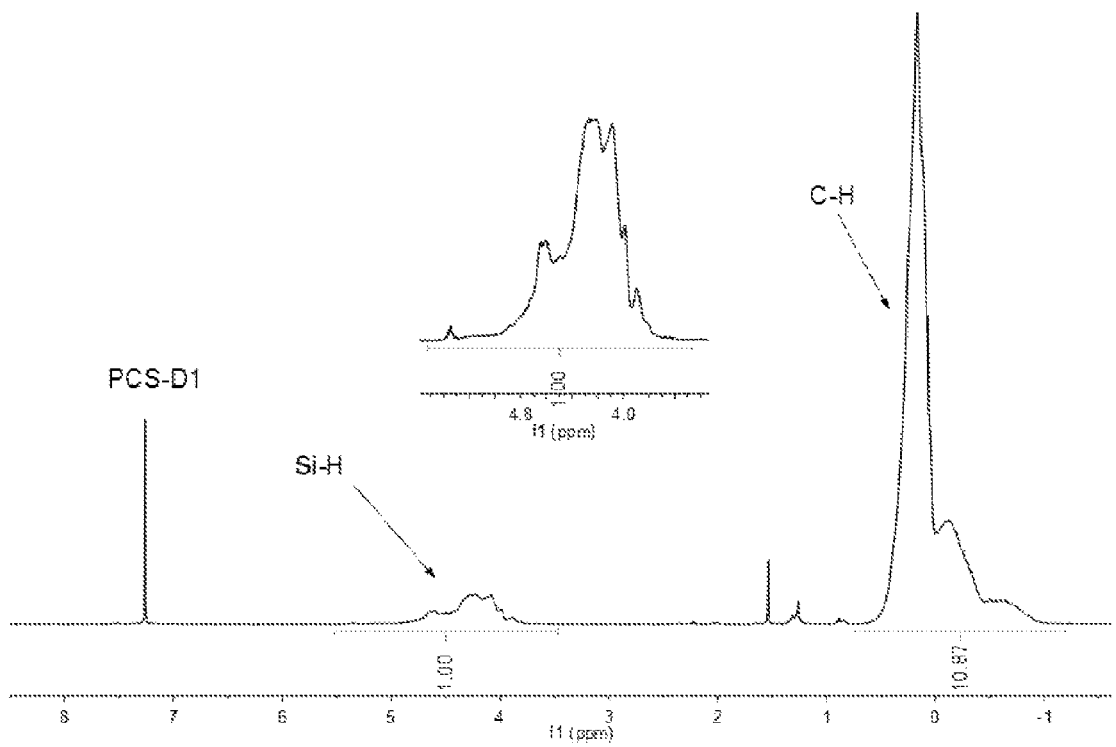
FIG. 5 is a $^1$H-NMR spectrum of PCS-D1 (COMPARATIVE EXAMPLE 1).
Figure 7:
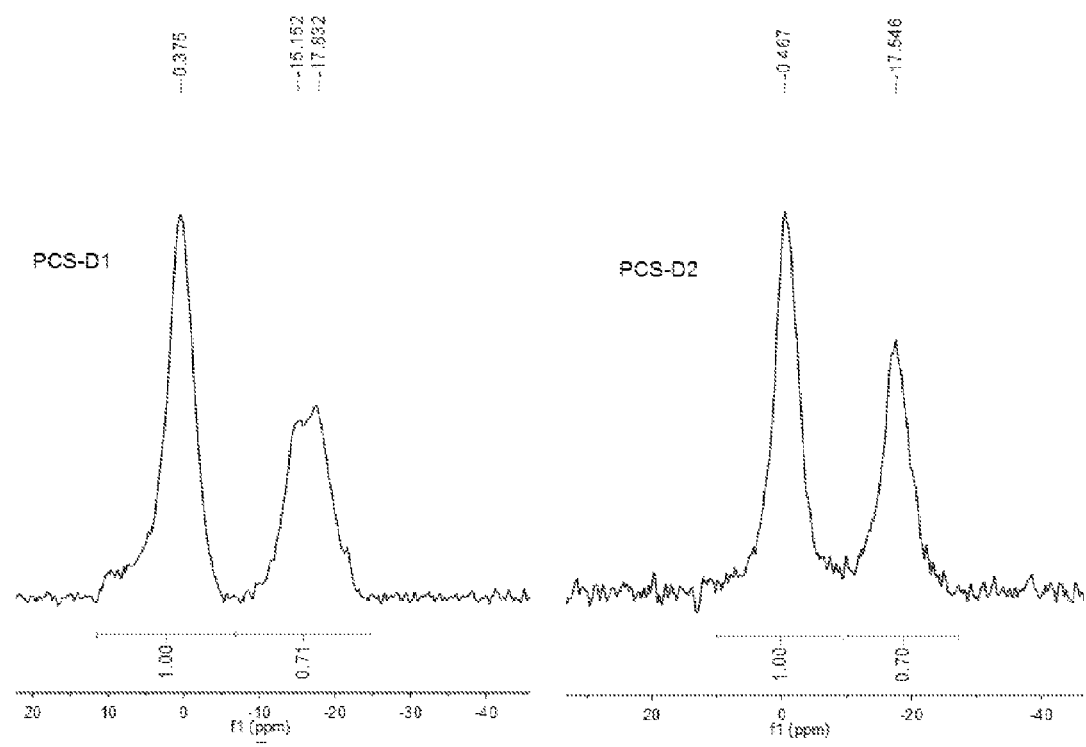
FIG. 7 is the $^{29}$Si-NMR spectra of PCS-D1 (COMPARATIVE EXAMPLE 1) and PCS-D2 (COMPARATIVE EXAMPLE 2).

Experimental procedures: (1) The synthesis apparatus for decomposition and rearrangement under atmospheric pressure was evacuated and refilled with high purity nitrogen three times; (2) Under the protection of the high purity nitrogen, 200 g of the liquid LPS prepared in PREPARATION EXAMPLE 1 was added in the reactor; (3) The temperature in the reactor was heated up to 430° C. by means of programmed temperature, and kept for 8 hours at the temperature, the total reaction time was about 51 hours; (4) Cooled to room temperature, changed to the distillation apparatus. The low-boiling products were removed at 360° C. by distillation. After cooled, 105 g of a pale yellow PCS product (denoted as PCS-D1) was obtained, which the synthetic yield of 52.5% and the ceramic yield of 35.5%, as shown in FIG. 4. The melting point of PCS-D1 is 135-150° C., and the NMR spectra are shown in FIG. 5 and FIG. 7.

Comparative Example 2

Figure 6:
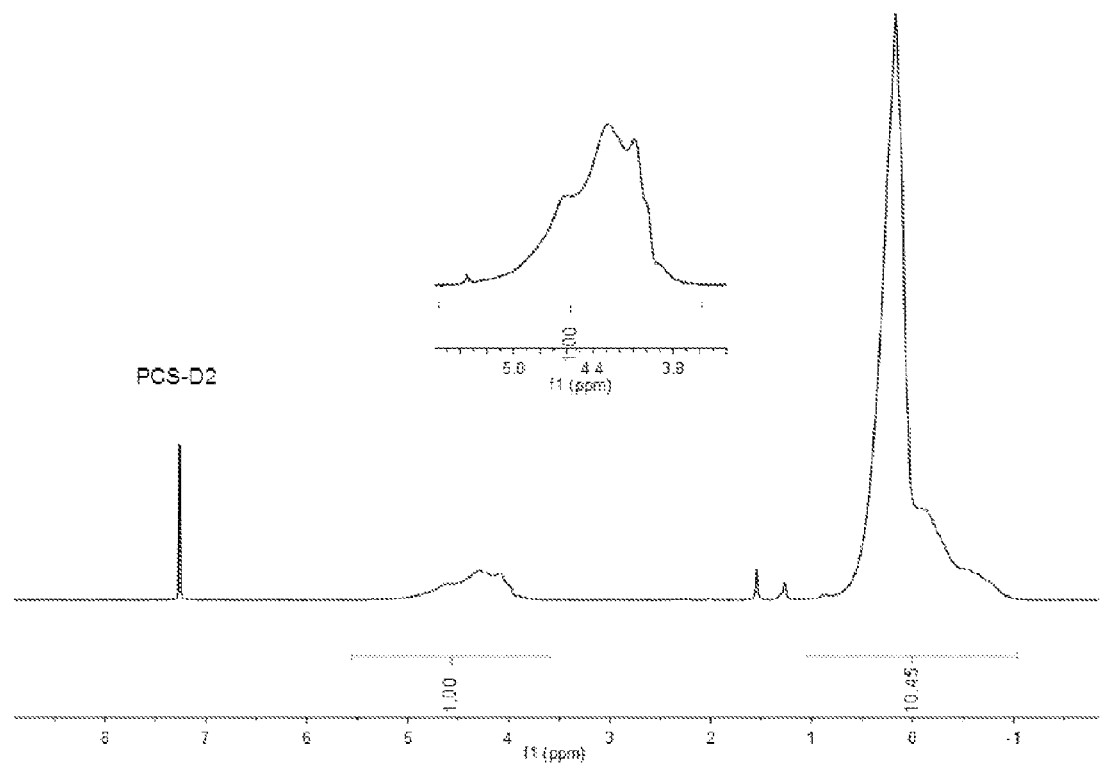
FIG. 6 is a $^1$H-NMR spectrum of PCS-D2 (COMPARATIVE EXAMPLE 2).

Experimental procedures: (1) The synthesis apparatus for decomposition and rearrangement under atmospheric pressure was evacuated and refilled with high purity nitrogen three times; (2) Under the protection of the high purity nitrogen, 200 g of the liquid LPS prepared in PREPARATION EXAMPLE 1 was added in the reactor; (3) The temperature in the reactor was heated up to 450° C. by means of programmed temperature, and kept for 4 hours at the temperature. The total time was about 64 hours; (4) Cooled to room temperature, xylene was added to dissolve the mixture, filter, and remove the insoluble substances; (5) The filtrate was distilled at 360° C., then the solvent and the low-boiling products were removed. After cooled, 96 g of a pale yellow PCS product (denoted as PCS-D2) was obtained, which the synthetic yield of 48% and the ceramic yield of 56.7%, as shown in FIG. 4. The melting point of PCS-D2 is 200-210° C., and the NMR spectra are shown in FIG. 6 and FIG. 7.

Compared to the spectra of the raw material LPS, the content of Si—H/C—H in $^1$H-NMR spectra is increased from 0.05 to 0.096, i.e., the content of Si—H has doubled, and the Si—Si bond disappears.

Example 1

Experimental procedures: (1) The synthesis apparatus for decomposition and rearrangement under atmospheric pressure was evacuated and refilled with high purity nitrogen three times; (2) Under the protection of high purity nitrogen, 190 g of the LPS prepared in PREPARATION EXAMPLE 1 was added in the reactor, and then introducing 0.38 g of the $B(C_6F_5)_3$ catalyst (0.20 wt % with respect to the amount of LPS) with stirring; (3) Programmed temperature, which heating up to 395° C. by 35 hours, and reacting for 5 hours at the temperature, the total reaction time was 40 hours; (6) Cooled to room temperature, 131.89 g of a crude product was obtained, and then the crude product was heated to 370° C. and the low molecular weight components were removed by distillation; (7) after cooled to room temperature, 122.31 g of a product was obtained.

Figure 8:
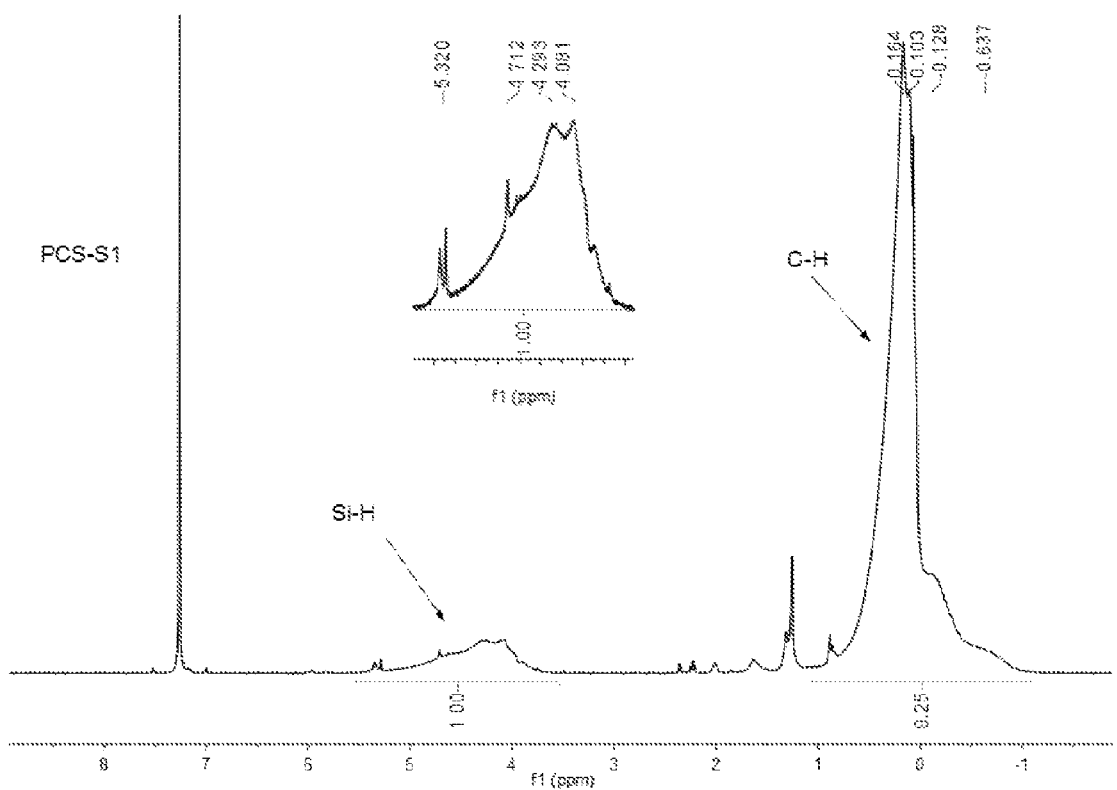
FIG. 8 is a $^1$H-NMR spectrum of PCS-S1 (EXAMPLE 1).
Figure 9:
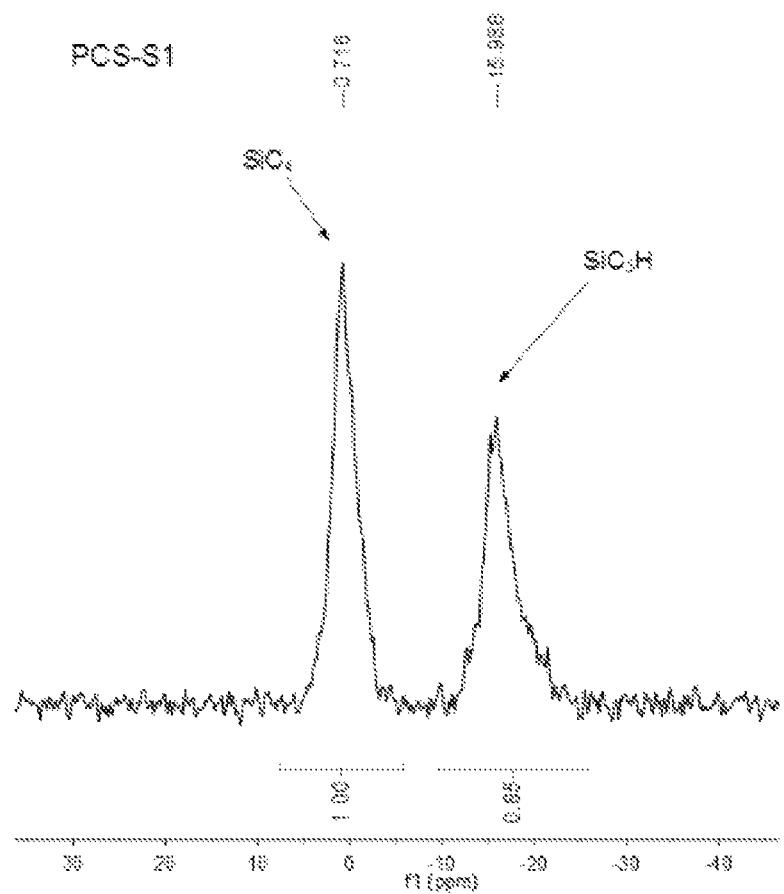
FIG. 9 is a $^{29}$Si-NMR spectrum of PCS-S1 (EXAMPLE 1).
Figure 10:
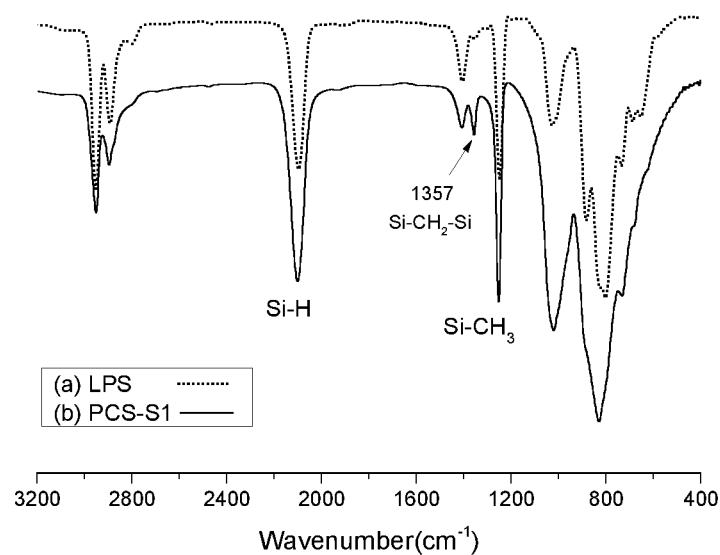
FIG. 10 is the FTIR spectra of PCS-S1 (EXAMPLE 1) and the raw material LPS.
Figure 11:
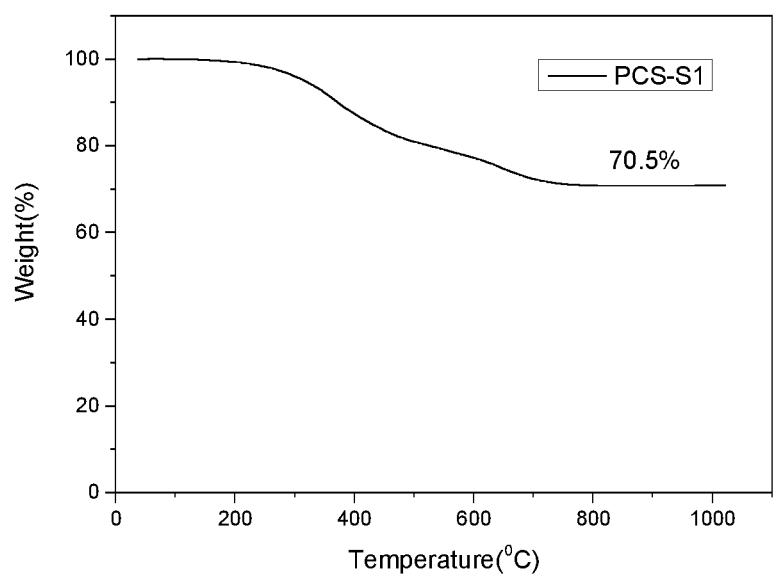
FIG. 11 is a thermo-gravimetric curve of PCS-S1 (EXAMPLE 1).

The synthesis yield of the PCS crude product of this example is 69.4%, the yield of the final product (PCS-S1) is 64.4%. As shown in the thermal gravimetric (TGA) curve in FIG. 11, the ceramic yield of PCS-S1 is 70.5%. The melting point of PCS-S1 is 235-250° C. The ratio of the peak area of C—H and Si—H shown in FIG. 8 and FIG. 9 is 9.25, and the ratio of the peak area of $SiC_3H$ and $SiC_4$ shown in FIG. 10 is 0.85. Compared to PCS-D2 that is without catalytic rearrangement under atmospheric pressure, the content of the Si—H is similar or slightly higher, indicating that the content of the Si—H existing in the PCS product catalytically synthesized by the present invention is higher.

As seen in the example above, by catalyzing with a small amount of above-mentioned boron-containing compound, the present invention provides a method for safely and stably converting liquid polysilane into the polycarbosilane, which is a precursor for silicon carbide ceramics. The invention has advantages, such as significantly shorten reaction time, increased synthetic yield, less catalyst, no harmful elements or impurities introduced in the product, good product quality, and so on. The synthesized polycarbosilane product can be used for the preparation of SiC fibres and SiC-based composite materials.

Example 2

Experimental procedures: (1) The synthesis apparatus for decomposition and rearrangement under atmospheric pressure was evacuated and refilled with high purity nitrogen three times; (2) Under the protection of high purity nitrogen, 190 g of the LPS prepared in PREPARATION EXAMPLE 1 was added in the reactor, and then introducing 0.38 g of the $B(C_6F_5)_3$ catalyst (0.20 wt % with respect to the amount of LPS) with stirring; (3) Programmed temperature, which heating up to 395° C. by 23.5 hours, and reacting for 4 hours at the temperature, the total reaction time was 27.5 hours; (6) The low molecular weight components were removed by distillation at 370° C.; (7) After cooled to room temperature, 113.05 g of a product (PCS-S2) was obtained, which the yield of 59.5% and the ceramic yield of 70.5%.

Example 3

Experimental procedures: (1) The synthesis apparatus for decomposition and rearrangement under atmospheric pressure was evacuated and refilled with high purity nitrogen three times; (2) Under the protection of high purity nitrogen, 190 g of the LPS prepared in PREPARATION EXAMPLE 1 was added in the reactor, and then introducing 0.28 g of the $B(C_6F_5)_3$ catalyst (0.15 wt % with respect to the amount of LPS) with stirring; (3) Programmed temperature, which heating up to 400° C. by 24 hours, and reacting for 2 hours at the temperature, the total reaction time was 26 hours; (6) The low molecular weight components were removed by distillation at 370° C.; (7) After cooled to room temperature, 113.05 g of a product (PCS-S3) was obtained, which the yield of 59.5% and the ceramic yield of 73%.

Example 4

Experimental procedures: (1) The synthesis apparatus for decomposition and rearrangement under atmospheric pressure was evacuated and refilled with high purity nitrogen three times; (2) Under the protection of high purity nitrogen, 190 g of the LPS prepared in PREPARATION EXAMPLE 1 was added in the reactor, and then introducing 0.19 g of the $B(C_6F_5)_3$ catalyst (0.10 wt % with respect to the amount of LPS) with stirring; (3) Programmed temperature, which heating up to 400° C. by 28 hours, and reacting for 3 hours at the temperature, the total reaction time was 31 hours; (6) The low molecular weight components were removed by distillation at 370° C.; (7) After cooled to room temperature, 117.8 g of a product (PCS-S4) was obtained, which the yield of 62% and the ceramic yield of 75%.

Example 5

Experimental procedures: (1) The synthesis apparatus for decomposition and rearrangement under atmospheric pressure was evacuated and refilled with high purity nitrogen three times; (2) Under the protection of high purity nitrogen, 190 g of the LPS prepared in PREPARATION EXAMPLE 1 was added in the reactor, and then introducing 0.19 g of the $B(C_6F_5)_3$ catalyst (0.10 wt % with respect to the amount of LPS) with stirring; (3) Programmed temperature, which heating up to 390° C. by 26 hours, and reacting for 6 hours at the temperature, the total reaction time was 32 hours; (6) The low molecular weight components were removed by distillation at 370° C.; (7) After cooled to room temperature, 121.6 g of a product (PCS-S5) was obtained, which the yield of 64% and the ceramic yield of 67%.

Example 6

Experimental procedures: (1) The synthesis apparatus for decomposition and rearrangement under atmospheric pressure was evacuated and refilled with high purity nitrogen three times; (2) Under the protection of high purity nitrogen, 190 g of the LPS prepared in PREPARATION EXAMPLE 1 was added in the reactor, and then introducing 0.19 g of the $B(C_6F_5)_3$ catalyst (0.10 wt % with respect to the amount of LPS) with stirring; (3) Programmed temperature, which heating up to 385° C. by 27 hours, and reacting for 9 hours at the temperature, the total reaction time was 36 hours; (6) The low molecular weight components were removed by distillation at 370° C.; (7) After cooled to room temperature, 131.2 g of a product (PCS-S6) was obtained, which the yield of 69% and the ceramic yield of 62%.

Example 7

Experimental procedures: (1) The synthesis apparatus for decomposition and rearrangement under atmospheric pressure was evacuated and refilled with high purity nitrogen three times; (2) Under the protection of high purity nitrogen, 200 g of the LPS prepared in PREPARATION EXAMPLE 1 was added in the reactor, and then introducing 0.1 g of the $B(C_6F_5)_3$ catalyst (0.05 wt % with respect to the amount of LPS) with stirring; (3) Programmed temperature, which heating up to 395° C. by 30 hours, and reacting for 8 hours at the temperature, the total reaction time was 38 hours; (6) The low molecular weight components were removed by distillation at 370° C.; (7) After cooled to room temperature, 118 g of a product (PCS-S7) was obtained, which the yield of 70% and the ceramic yield of 62%.

Example 8

Experimental procedures: (1) The synthesis apparatus for decomposition and rearrangement under atmospheric pressure was evacuated and refilled with high purity nitrogen three times; (2) Under the protection of high purity nitrogen, 200 g of the LPS prepared in PREPARATION EXAMPLE 1 was added in the reactor, and then introducing 0.4 g of the $B(C_6F_5)_3$ catalyst (0.20 wt % with respect to the amount of LPS) with stirring; (3) Programmed temperature, which heating up to 365° C. by 28 hours, and reacting for 8 hours at the temperature, the total reaction time was 36 hours; (6) The low molecular weight components were removed by distillation at 360° C.; (7) After cooled to room temperature, 125.2 g of a product (PCS-S8) was obtained, which the yield of 62.6% and the ceramic yield of 60%.

Example 9

Experimental procedures: (1) The synthesis apparatus for decomposition and rearrangement under atmospheric pressure was evacuated and refilled with high purity nitrogen three times; (2) Under the protection of high purity nitrogen, 200 g of the LPS prepared in PREPARATION EXAMPLE 1 was added in the reactor, and then introducing 0.4 g of the $B(C_6F_5)_3$ catalyst (0.20 wt % with respect to the amount of LPS) with stirring; (3) Programmed temperature, which heating up to 385° C. by 28 hours, and reacting for 5 hours at the temperature, the total reaction time was 33 hours; (4) The low molecular weight components were removed by distillation at 360° C.; (5) After cooled to room temperature, 131.2 g of a product (PCS-S9) was obtained, which the yield of 65.6% and the ceramic yield of 63%.

Example 10

Experimental procedures: (1) The 2 L high temperature and high pressure reactor was evacuated and refilled with high purity nitrogen three times; (2) Under the protection of the high purity nitrogen, 900 g of the LPS prepared in PREPARATION EXAMPLE 1 was added, and then introducing 13.5 g of 10 wt % of B(C$_6$F$_5$)$_3$ in xylene solution (i.e., containing 0.15 wt % of the catalyst) with stirring; (3) Programmed temperature, which heating up to 375° C. by 4 hours, and reacting for 4 hours at the temperature, the total reaction time was 8 hours, and the maximum pressure during the reaction was 7.5 MPa; (4) Cooled to room temperature, xylene was added to dissolve the mixture, and filtered; (5) The filtrate was transferred into a 3 L three-necked glass flask. At first, the solvent was evaporated at 150-180° C. under the protection of nitrogen, and then heated up to 360° C. under atmospheric pressure or 250° C. under reduced pressure to remove the low molecular weight products by distillation; (7) After cooled to room temperature, 648 g of a product (PCS-S10) was obtained, which the yield of 72% and the ceramic yield of 66%.

Example 11

Experimental procedures: (1) The 2 L high temperature and high pressure reactor with the reflux condenser was evacuated and refilled with high purity nitrogen three times; (2) Under the protection of the high purity nitrogen, 900 g of the LPS prepared in PREPARATION EXAMPLE 1 was added, and then introducing 9 g of 10 wt % of B(C$_6$F$_5$)$_3$ in xylene solution (i.e., containing 0.10 wt % of the catalyst) with stirring; (3) Programmed temperature, which heating up to 395° C. by 4 hours, and reacting for 2 hours at the temperature, the total reaction time was 6 hours, and the maximum pressure during the reaction was 5 MPa; (4) Cooled to room temperature, xylene was added to dissolve the mixture, and filtered; (5) The filtrate was transferred into a 3 L three-necked glass flask, at first, the solvent was evaporated at 150-180° C. under the protection of nitrogen, and then heated up to 360° C. under atmospheric pressure or 250° C. under reduced pressure to remove the low molecular weight products by distillation; (7) After cooled to room temperature, 612 g of a product (PCS-S11) was obtained, which the yield of 68% and the ceramic yield of 68%.

Example 12

Experimental procedures: (1) The 2 L high temperature and high pressure reactor with the reflux condenser was evacuated and refilled with high purity nitrogen three times; (2) Under the protection of the high purity nitrogen, 900 g of the PDMS powder was added, 1.08 g of B(C$_6$F$_5$)$_3$ (0.12 wt %) was added, and then stirred homogenously for 30 minutes; (3) Heating the temperature up to 360° C. by 2 hours, and reacting for 3 hours at the temperature, and then heating the temperature gradually up to 380° C. by 2 hours, and keeping for 3 hours, the total reaction time was 10 hours, and the maximum pressure during the reaction was 5 MPa; (4) Cooled to room temperature, xylene was added to dissolve the mixture, and filtered; (5) The filtrate was transferred into a 3 L three-necked glass flask, at first, the solvent was evaporated at 150-180° C. under the protection of nitrogen, and then heated up to 360° C. under atmospheric pressure or 250° C. under reduced pressure to remove the low molecular weight products by distillation; (7) After cooled to room temperature, 558 g of a product (PCS-S12) was obtained, which the yield of 62% and the ceramic yield of 67%.

Example 13

Experimental procedures: (1) The 2 L high temperature and high pressure reactor with the reflux condenser was evacuated and refilled with high purity nitrogen three times; (2) Under the protection of high purity nitrogen, 900 g of the LPS prepared in PREPARATION EXAMPLE 1 was added, and then introducing 9 g of 10 wt % of B(C$_6$F$_5$)$_3$ in xylene solution (i.e., containing 0.10 wt % of the catalyst) with stirring; (3) Programmed temperature, which heating up to 365° C. by 4 hours, and reacting for 5 hours at the temperature, the total reaction time was 9 hours, and the maximum pressure during the reaction was 5 MPa; (4) Cooled to room temperature, xylene was added to dissolve the mixture, and filtered; (5) The filtrate was transferred into a 3 L three-necked glass flask, at first, the solvent was evaporated at 150-180° C. under the protection of nitrogen, and then heated up to 360° C. under atmospheric pressure or 250° C. under reduced pressure to remove the low molecular weight products by distillation; (7) After cooled to room temperature, 643.5 g of a product (PCS-S13) was obtained, which the yield of 71.5% and the ceramic yield of 62%.

Example 14

Experimental procedures: (1) The 2 L high temperature and high pressure reactor with the reflux condenser was evacuated and refilled with high purity nitrogen three times; (2) Under the protection of the high purity nitrogen, 900 g of the LPS prepared in PREPARATION EXAMPLE 1 was added, and introducing 4.5 g of 10 wt % of B(C$_6$F$_5$)$_3$ in xylene solution (i.e., containing 0.05 wt % of the catalyst) and 0.9 g of ITQ-2 zeolite powder, and then stirred for 10 minutes; (3) Programmed temperature, which heating up to 380° C. by 3.5 hours, and reacting for 4.5 hours at the temperature, and the total reaction time was 8 hours; (4) Cooled to room temperature, xylene was added to dissolve the mixture, and filtered; (5) The filtrate was transferred into a 3 L three-necked glass flask, at first, the solvent was evaporated at 150-180° C. under the protection of nitrogen, and then heated up to 380° C. under atmospheric pressure to remove the low molecular weight products by distillation; (7) After cooled to room temperature, 675 g of a product (PCS-S14) was obtained, which the yield of 75% and the ceramic yield of 72%.

The invention claimed is:

1. A method for preparing a polycarbosilane, comprising:
   mixing a raw material with a boron-containing catalyst to obtain a reaction mixture;
   heating the reaction mixture under atmospheric pressure or an elevated pressure to obtain polycarbosilane (PCS),
   wherein the raw material is poly(dimethylsilane) (PDMS) or a liquid silane-carbosilane compound (LPS), and
   wherein the boron-containing catalyst is a compound of formula (1) or a complex the compound of formula (1) with ether or water, $$B(C_6R_5)_3 \qquad (1)$$

wherein, each R group is independently H, halogen, or a C1-C4 alkyl group.

2. The preparation method of claim 1, wherein said reaction temperature is 365-400° C.

3. The preparation method of claim 2, wherein a reaction time is 1-10 hours.

4. The preparation method of claim 1, wherein an amount of the boron-containing catalyst is less than 1 wt % based on a total mass of the raw material.

5. The preparation method of claim 4, further comprising:
   distilling the reaction mixture under atmospheric pressure to remove low molecular weight compounds.

6. The preparation method of claim 4, wherein the amount of the boron-containing catalyst is less than 0.5 wt %.

7. The preparation method of claim 4, wherein the amount of the boron-containing catalyst is 0.05-0.3 wt %.

8. The preparation method of claim 1, wherein each R is independently selected from the group consisting of H, F, Cl, Br, methyl, ethyl, n-propyl, isopropyl, n-butyl, isobutyl, and tert-butyl.

9. The preparation method of claim 1, wherein the boron-containing catalyst is tri(pentafluorophenyl)borane $(B(C_6F_5)_3)$ or a complex thereof with ether or water, said complex is $B(C_6F_5)_3.H_2O$, $B(C_6F_5)_3.Et_2O$, $B(C_6F_5)_3.CH_3OCH_2CH_2OCH_3$.

10. The preparation method of claim 9, wherein the boron-containing catalyst is tri(pentafluorophenyl)borane $(B(C_6F_5)_3)$.

11. The preparation method of claim 1, further comprising heating PDMS to obtain LPS.

12. The preparation method of claim 1, wherein said reaction temperature is 375-395° C.

* * * * *